A. Y. PATON.
CRANK SHAFT CAP.
APPLICATION FILED APR. 19, 1915.
1,179,453.
Patented Apr. 18, 1916.
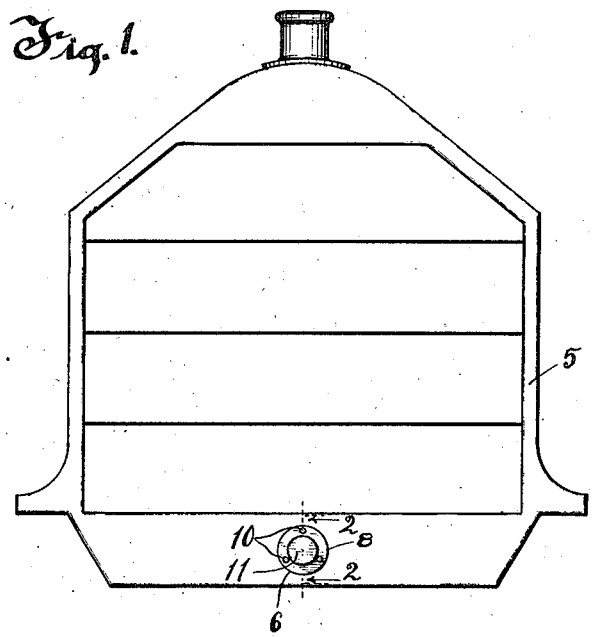
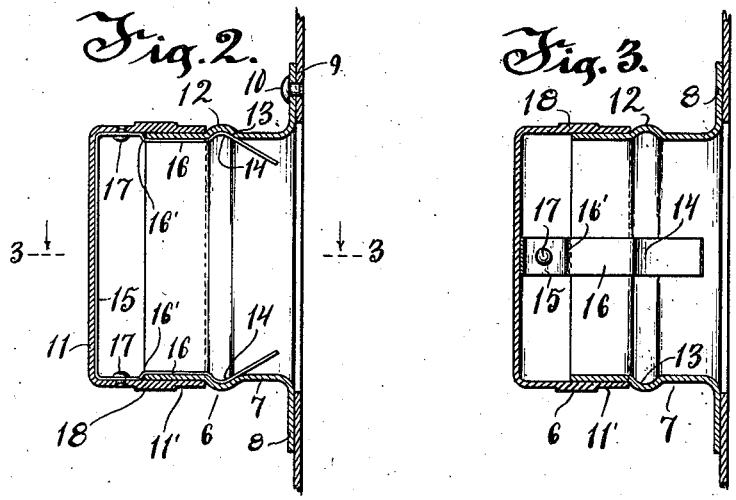
INVENTOR
Alexander Y. Paton.
By Morsell, Keeney & French,
ATTORNEYS

UNITED STATES PATENT OFFICE.

ALEXANDER Y. PATON, OF RACINE, WISCONSIN, ASSIGNOR TO ROBERT BALDWIN LANG, OF RACINE, WISCONSIN.

CRANK-SHAFT CAP.

1,179,453. Specification of Letters Patent. Patented Apr. 18, 1916.

Application filed April 19, 1915. Serial No. 22,525.

*To all whom it may concern:*

Be it known that I, ALEXANDER Y. PATON, a citizen of the United States, and resident of Racine, in the county of Racine and State of Wisconsin, have invented new and useful Improvements in Crank-Shaft Caps, of which the following is a description, reference being had to the accompanying drawings, which are a part of this specification.

This invention relates to improvements in crank shaft caps.

While modern automobiles of today are usually provided with self starters it has been found necessary to also include the ordinary hand starting system which may be used in the event that the self starter fails to perform its function. As the crank shaft, to which the hand crank is connected, usually projects outwardly from the front portion of the machine and presents an unsightly appearance and becomes covered with dust and dirt within a short time, caps have been provided for covering the outer ends of the crank shafts but it has heretofore been found difficult to prevent the removable portions of the caps from disengaging the fixed portions and becoming accidentally lost.

It is one of the objects of the present invention to overcome the before mentioned objectionable features and provide a crank shaft cap which may be easily fastened to the machine and in which the removable end cover portion is securely locked in closed position against accidental disengagement.

A further object of the invention is to provide a crank shaft cap which is of simple construction, is strong and durable and is well adapted for the purpose desired.

With the above and other objects in view the invention consists of the improved crank shaft cap and its parts and combinations as set forth in the claims, and all equivalents thereof.

In the accompanying drawing in which the same reference characters indicate the same parts in all of the views: Figure 1 is a front view of a portion of an automobile provided with the improved crank shaft cap; Fig. 2 is a vertical sectional view on a larger scale of the improved crank shaft cap taken on line 2—2 of Fig. 1; and Fig. 3 is a horizontal sectional view taken on line 3—3 of Fig. 2.

Referring to the drawing the numeral 5 indicates the front portion of an automobile and 6 the improved crank shaft cap mounted thereon and covering the end of the crank shaft. The cap is formed of sheet metal and comprises the outwardly projecting tubular body portion 7 having an annular flange 8 formed around its inner edge which is adapted to rest upon the portion of the automobile to which it is attached. The flange portion is provided with a plurality of perforations 9 through which extend the rivets, bolts or other means 10 for attaching the cap member to its support. The outer open end of the tubular portion is closed by a cup shaped cover 11, the tubular side portion 11′ of which snugly telescopes over the outer end of the body portion to the embossed annular rib 12 formed on said body portion. This embossed rib of the body portion forms an inner annular locking groove or shoulder 13 to receive the rounded shouldered portions 14 of the U-shaped spring 15.

Th stem portions 16 of the U-shaped spring are connected to the tubular side portions of the cover by rivets 17 and said stem portions are offset inwardly as indicated by the numeral 16′ to clear the outer tubular end portion of the body member. The inner ends of the stem portions 16 are inclined inwardly toward each other to permit the stems to be easily inserted into the body portion of the cap. The stem portions 16 project outwardly from the cover a sufficient distance to permit the rounded shouldered portions 14 to enter the annular recess and form a locking engagement therewith.

The tubular portion of the cover is formed with a raised milled band or portion 18 to provide a grasp to permit the easy removal of the cover from the body portion.

In use the cover is pulled off the body portion when it is desired to crank the engine by hand and when the engine is started the cover may be easily replaced by pushing it on the said body portion. When thus replaced the shouldered portions of the spring stems will enter the annular recess and securely hold said cover in closed position.

From the foregoing description it will be seen that the crank shaft cap is of very simple construction and is well adapted for the purpose described.

What I claim as my invention is:

1. A crank shaft cap comprising a tubular body portion, a cover slidably engaging the outer end of said body portion, and yielding means on the cover coöperating with means on the body portion for locking the cover to said body portion.

2. A crank shaft cap, comprising a tubular body portion having a recessed inner portion, a cover engaging the outer end of the body portion, and a yielding means carried by the cover and entering the recess of the inner portion for locking the cover to the body portion.

3. A crank shaft cap, comprising a tubular body portion having an inner shouldered portion, a cover engaging the outer end portion of the body portion, and a shouldered yielding member carried by the cover and entering the tubular portion, the shouldered portion of the yielding member engaging the shoulder of the inner portion for locking said cover to said body portion.

4. A crank shaft cap, comprising a tubular body portion having a recessed inner portion, a cover closing the open end of the tubular portion, and yielding means carried by the cover and projecting outwardly therefrom and entering the tubular part of the body portion and lockingly entering the recess of said body portion.

5. A crank shaft cap, comprising a tubular body portion having means for attaching it to a support and also having an inner shouldered portion, a cover closing the open end of the tubular portion, and a U-shaped spring mounted in the cover and having shouldered stem portions which enter the body portion and lockingly engage the shoulder of said body portion.

6. A crank shaft cap, comprising a tubular body portion having a flanged inner edge and a medial inner shouldered portion, a cup shaped cover telescoping the outer end of the tubular portion, and a U-shaped spring mounted within the cover and having outwardly projecting shouldered stems which enter the tubular portion and lockingly engage the shoulder of the said tubular member.

7. A crank shaft cap, comprising a tubular body portion having a flanged inner edge and a medial inner shouldered portion, a cup shaped cover telescoping the outer end of the tubular portion, and a U-shaped spring mounted within the cover and having outwardly projecting shouldered stems which enter the tubular portion and lockingly engage the shoulder of said tubular member, said stem portions also being offset inwardly to clear the tubular portion of the body member and having forward end portions angled toward each other.

In testimony whereof, I affix my signature, in presence of two witnesses.

ALEXANDER Y. PATON.

Witnesses:
EDGAR S. CRAIG,
EDGAR JANES.